Oct. 18, 1955  C. E. HILTON  2,720,742

ROTARY MOWER AND CATCHER

Filed July 15, 1954  3 Sheets-Sheet 1

Clyde E. Hilton
INVENTOR.

BY
Attorneys

Oct. 18, 1955  C. E. HILTON  2,720,742
ROTARY MOWER AND CATCHER
Filed July 15, 1954  3 Sheets-Sheet 2
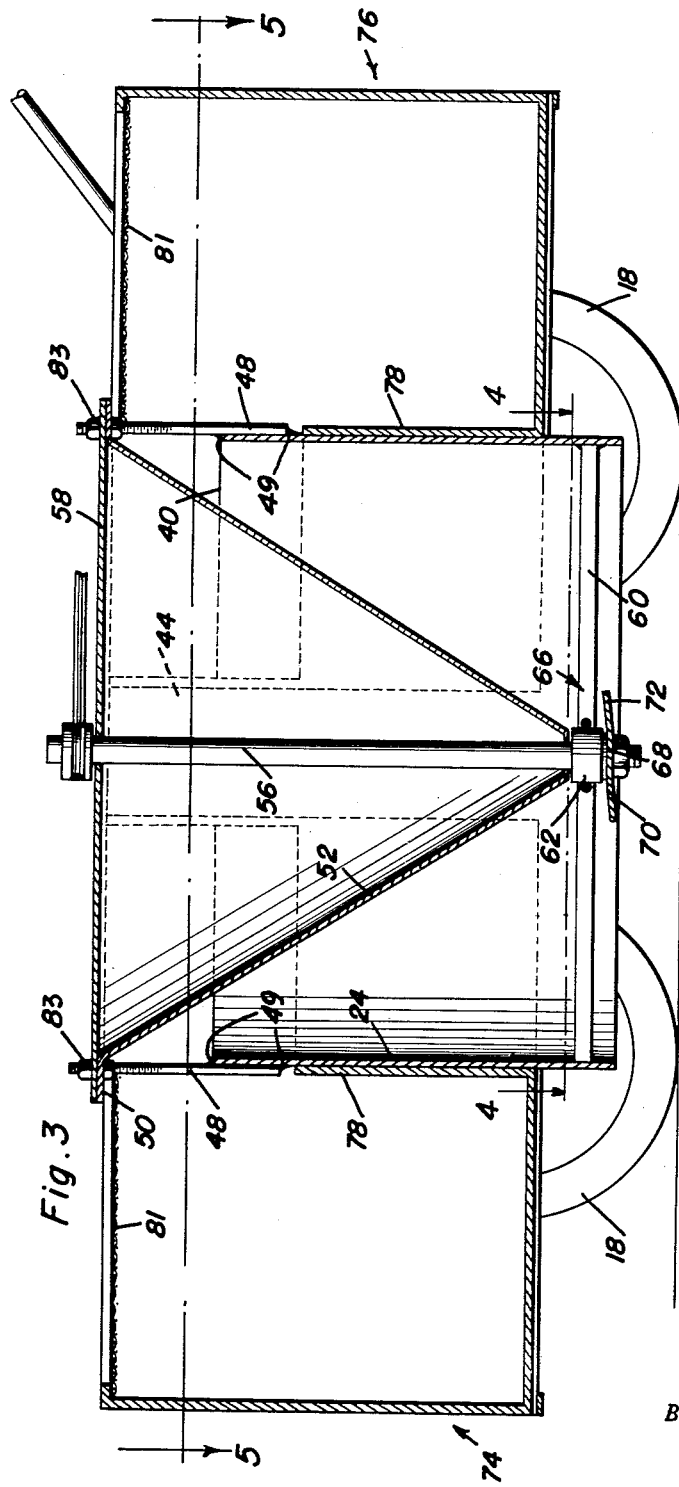
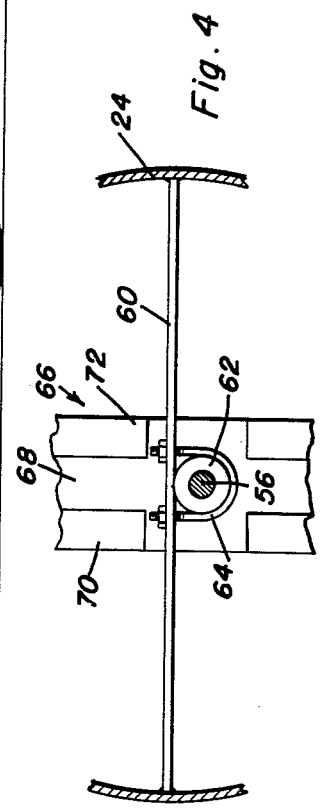
Clyde E. Hilton
INVENTOR.

Oct. 18, 1955

C. E. HILTON 2,720,742

ROTARY MOWER AND CATCHER

Filed July 15, 1954

Clyde E. Hilton
INVENTOR.

BY *Clarence A. O'Brien*
*and Harvey B. Jackson*
Attorneys

United States Patent Office 2,720,742
Patented Oct. 18, 1955

2,720,742
ROTARY MOWER AND CATCHER

Clyde E. Hilton, Tampa, Fla.

Application July 15, 1954, Serial No. 443,535

3 Claims. (Cl. 56—194)

This invention relates generally to lawn mowers and has for its primary object the provision of an improved type of rotary lawn mower which features a compact arrangement of parts including removable bin members for collecting or receiving material cut, such as grass or the like.

Another object of this invention is to provide an improved rotary lawn mower assembly in which a cylindrical casing member cooperates with a conical deflector and removable bin members, such as to provide an improved pick-up means for cut material.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged vertical longitudinal section taken substantially along the plane of section line 3—3 of Figure 1;

Figure 4 is a horizontal section taken substantially along the plane indicated by section line 4—4 in Figure 3.

Figure 1:
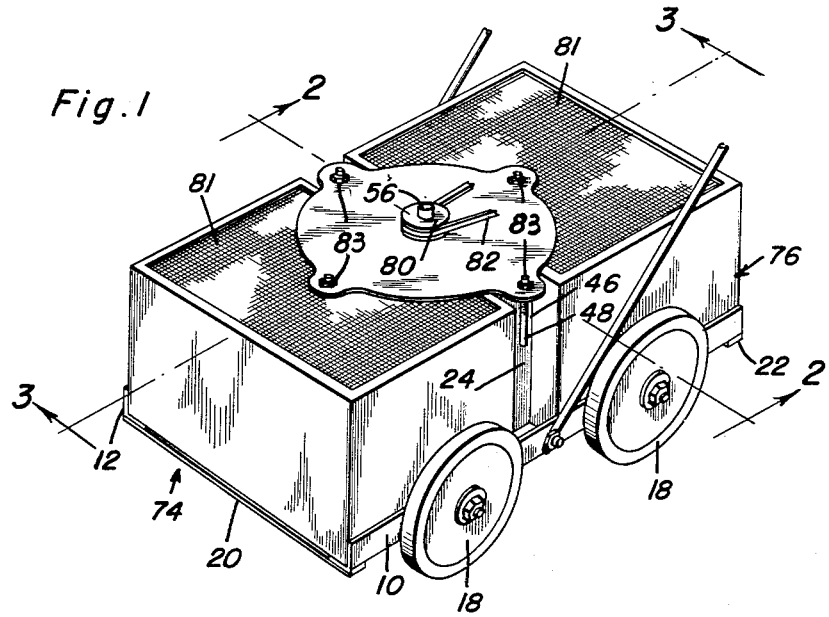
Figure 1 is a perspective view of the improved mower.
Figure 2:
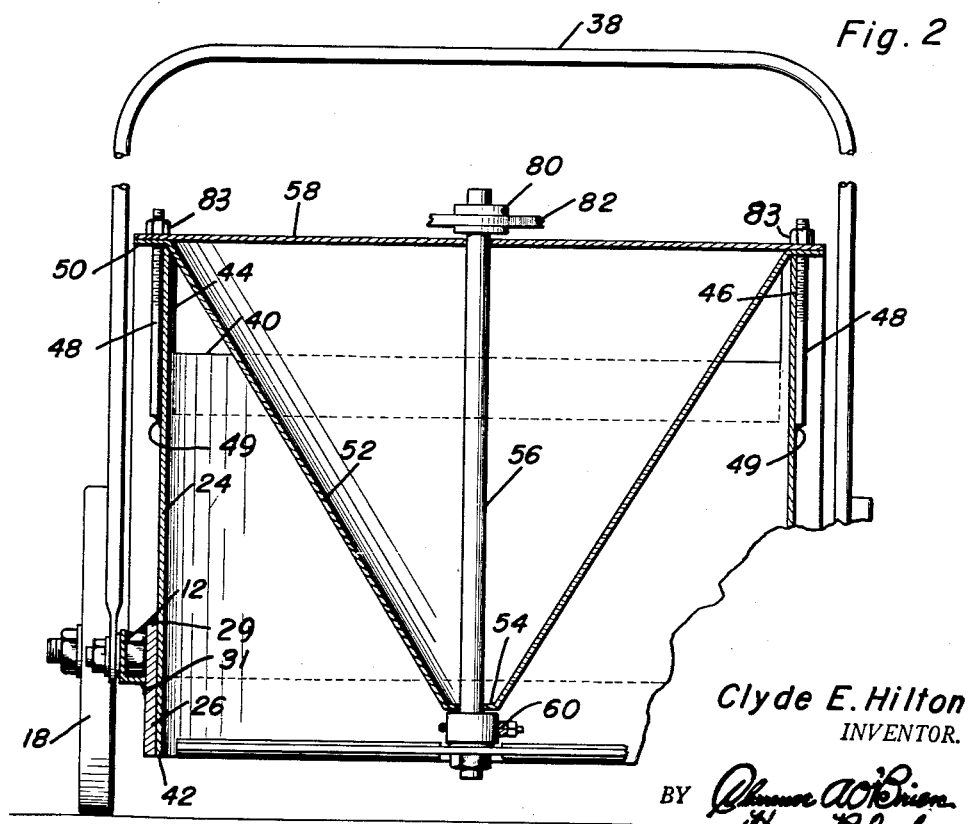
Figure 2 is an enlarged transverse vertical section taken substantially along the plane of section line 2—2 of Figure 1.
Figure 5:
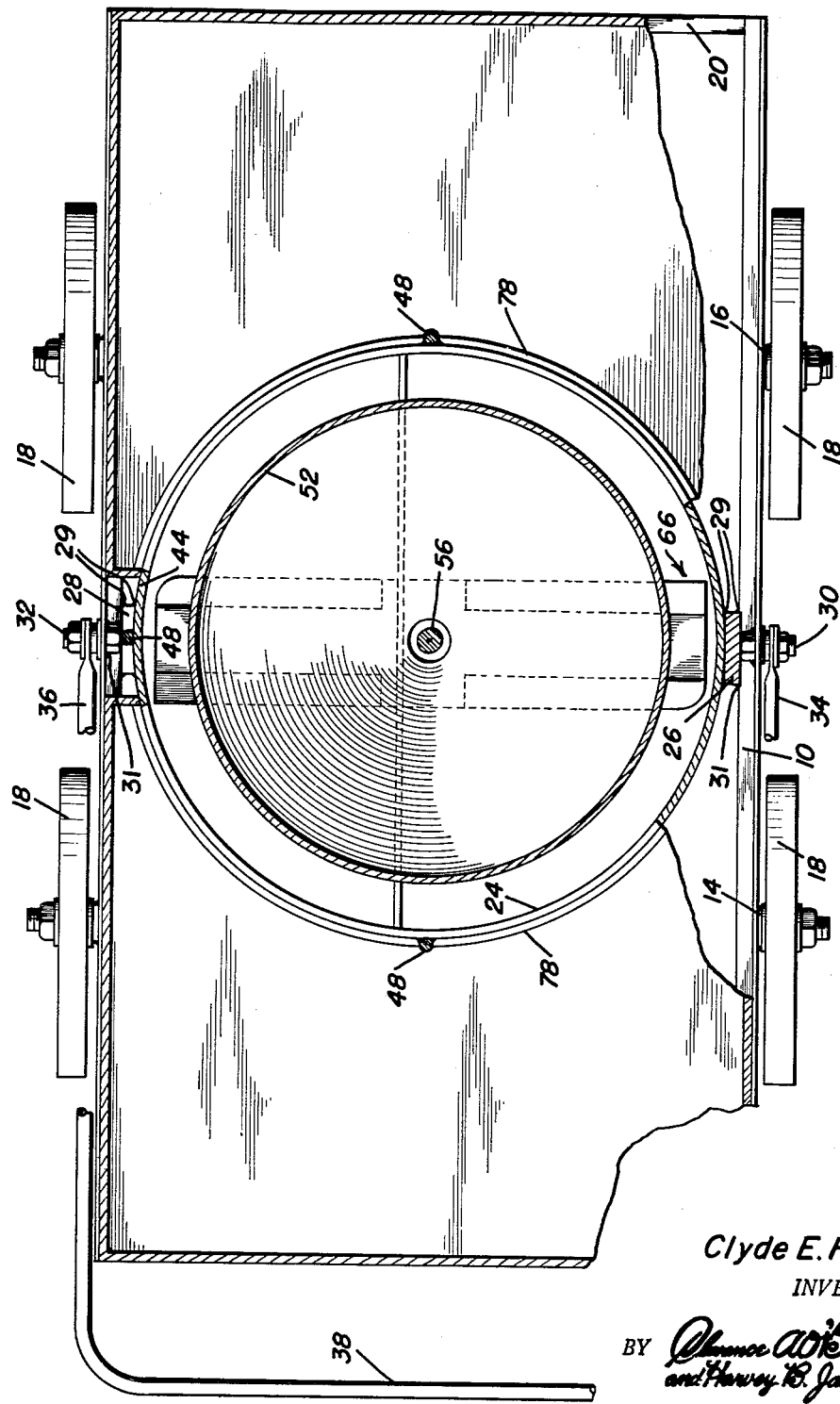
Figure 5 is an enlarged horizontal section taken substantially along the plane of section line 5—5 in Figure 3.

Referring now more particularly to the drawings, the mower will be seen to consist essentially of a pair of spaced parallel side rail members 10 and 12 which preferably takes the form of angle iron construction and which are provided at spaced points along their length with a pair of laterally projecting axle members 14 and 16 upon which the supporting wheel members 18 are journalled. The side rail members are rigidly interconnected at their opposite ends by the cross frame members 20 and 22 and are interconnected in their intermediate portions by a cylindrical casing assembly 24. The casing 24 is vertically disposed and is rigidly connected between the side rails 10 and 12 by means of the strap members 26 and 28 rigidly secured thereto as by welding or the like indicated by reference character 29. Rigidly secured as by welding 31 adjacent the strap members 26 and 28 are the bolt members 30 and 32 which removably receive the free ends of the leg members 34 and 36 forming part of the handle assembly for the mower. In this respect, it will be noted that the leg members 34 and 36 are connected at their upper ends by a hand-grip portion 38 as will be readily apparent.

The upper edge of the casing 24 is indicated by the reference character 40 whereas the lower edge thereof is indicated by the reference character 42 and it will be noted that the lower edge 42 is disposed closely adjacent the ground surface. The casing 24 is provided at its opposite sides thereof with the extension portions 44 and 46, the purpose of which will be presently apparent.

At circumferentially spaced points around the periphery of the casing 24 are the stud members 48 which are rigidly affixed thereto by any suitable means such as welding 49 or the like and these stud members 48 are adapted to project through a circumferential flange 50 formed on the upper end of a conical inverted deflector member 52. The deflector member has its apex or lower portion 54 disposed just inside the casing 24 adjacent the lower end thereof and a drive shaft member 56 extends coaxially therethrough in the manner shown. It is to be noted that the deflector member 52 is spaced at all points from the casing 24 and that the upper end thereof is spaced somewhat above the upper edge 40 of the casing 24. Thus, an opening is provided between the casing 24 and the deflector 52 except in that portion where the projections 44 and 46 are formed on the casing inasmuch as these projections extend upwardly from the upper edge 40 of the casing into contact with the undersurface of the horizontal flange 50 of the deflector 52. A cover or mounting plate member 58 is secured on the upper surface of the flange 50 in covering relation to the deflector member 52 and may be provided at its central portion with a suitable bearing for journalling the shaft 56.

The casing 24 carries adjacent its lower edge a cross brace member 60 which in turn carries a suitable bearing member 62 for the lower end of the shaft 56 which is secured to the cross brace 60 by means of a U-bolt member 64.

Secured by any suitable means to the lower end of the shaft 56 is a rotary lawn mower blade member 66 which includes a horizontal central portion 68 and angulated side portions 70 and 72.

Thus, the blade 66 is pitched such that when it is rotated it will effect a vertically rising air column within the casing 24 between the casing and the deflector 52. This air column will force material cut by the mower blade 66 to be projected upwardly within the casing 24 and outwardly thereof at opposite ends of the machine through the openings formed between the upper edge 40 of the casing 24 and the deflector 52. For the purpose of receiving or collecting material thus projected from the casing 24, a pair of removable bin assemblies indicated generally by the reference characters 74 and 76 are provided. Each bin member is of generally rectangular configuration and is completely closed with the exception of its inner end wall 78 which is of arcuate configuration to snugly engage the outer surface of the casing 24 and it will also be noted that the top wall of each collector bin is formed of a sheet of foraminous material 81. It will be now apparent that the projections 44 and 46 of the casing 24 bridge the gap between the collector bin members and thus force all material ejected from the casing into these bins.

Suitable nuts 83 are threadedly provided on the stud members 48 for removably securing the cover plate 58 to the deflector 52. This cover plate 58 preferably forms a mounting means for any suitable power mechanism for driving the shaft 56 and for this purpose it will be readily apparent that the upper end of the shaft 56 may be provided with a pulley 80 over which a belt member 82 is trained for connection with a drive pulley of the power source. Or, as an alternative, the upper end of the shaft 56 may be coupled directly to a suitable drive mechanism such as the crank shaft of an internal combustion engine or the like.

It will, of course, be readily apparent that the opposite side walls of the bins 74 and 76 are received between the upstanding legs of the opposite side frame members 10 and 12 such that when desired the bins may be slidably removed from the frame and emptied through their openings formed between the upper edges of the inner walls 78 and their top walls 81.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A lawn mower comprising a wheeled frame, a cylindrical casing secured to said frame and having its lower edge disposed adjacent the ground surface, an inverted, conical deflector disposed partially within said casing and having its upper end projecting therefrom, a pair of removable collector bins mounted on said frame, said bins having arcuate inner end portions partially embracing said casing, said inner arcuate ends of the bins being open at an upper portion thereof to communicate with the interior of said casing adjacent the upper portion of said deflector, a vertical drive shaft disposed axially of said deflector and having a lower end portion projecting therefrom, and a cutter blade secured to the lower end portion of said drive shaft, said blade having a pitch such as to direct, when rotated, air and cut material upwardly within said casing adjacent the outer surface of said deflector and into said bins.

2. A lawn mower comprising a wheeled frame, a cylindrical casing secured to said frame and having its lower edge disposed adjacent the ground surface, an inverted, conical deflector disposed partially within said casing and having its upper end projecting therefrom, a pair of removable collector bins mounted on said frame, said bins having arcuate inner end portions partially embracing said casing, said inner arcuate ends of the bins being open at an upper portion thereof to communicate with the interior of said casing adjacent the upper portion of said deflector, a vertical drive shaft disposed axially of said deflector and having a lower end portion projecting therefrom, and a cutter blade secured to the lower end portion of said drive shaft, said blade having a pitch such as to direct, when rotated, air and cut material upwardly within said casing adjacent the outer surface of said deflector and into said bins, said bins having top wall portions formed of foraminous material.

3. A lawn mower comprising a wheeled frame, a vertical casing secured to said frame and having a lower edge disposed adjacent the ground surface, an upwardly diverging deflector disposed partially within said casing, said deflector having its smaller end disposed lowermost and adjacent the plane containing the lower edge of said casing, a pair of removable collector bins mounted on said frame, said bins having arcuate inner end portions partially embracing said casing, said inner arcuate ends of the bins being open at an upper portion thereof to communicate with the interior of said casing adjacent the upper portion of said deflector, a vertical drive shaft disposed axially of said deflector and having a lower end portion projecting therefrom, and a cutter blade secured to the lower end portion of said drive shaft, said blade having a pitch such as to direct, when rotated, air and cut material upwardly within said casing adjacent the upwardly diverging deflector and into said bins.

References Cited in the file of this patent

UNITED STATES PATENTS

| 1,336,257 | Muzzy | Apr. 6, 1920 |
| 1,622,611 | Sera | Mar. 29, 1927 |
| 2,390,321 | Packwood | Dec. 4, 1945 |

FOREIGN PATENTS

| 385,473 | Great Britain | Dec. 29, 1932 |